United States Patent
Fareed (10) Patent No.: US 8,402,471 B2
(45) Date of Patent: Mar. 19, 2013

(54) METHODS AND APPARATUS TO BENCHMARK A COMPUTER SYSTEM BASED ON EXECUTING INSTRUCTIONS USING DIFFERENT NUMBERS OF THREADS

(75) Inventor: Hussein Fareed, Milton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 516 days.

(21) Appl. No.: 12/643,755

(22) Filed: Dec. 21, 2009

(65) Prior Publication Data

US 2011/0154356 A1 Jun. 23, 2011

(51) Int. Cl.
  *G06F 9/455* (2006.01)
  *G06F 9/46* (2006.01)
(52) U.S. Cl. ............................... 718/105; 718/1
(58) Field of Classification Search ............... 718/1, 105
  See application file for complete search history.

(56) References Cited

U.S. PATENT DOCUMENTS

| | | | |
|---|---|---|---|
| 5,953,530 A | 9/1999 | Rishi et al. | |
| 6,754,850 B2 | 6/2004 | Grey et al. | |
| 6,826,716 B2 | 11/2004 | Mason | |
| 7,007,270 B2 | 2/2006 | Martin et al. | |
| 7,010,466 B2 | 3/2006 | Lee et al. | |
| 7,213,234 B1 | 5/2007 | Below | |
| 7,389,497 B1 | 6/2008 | Edmark et al. | |
| 7,412,354 B2 | 8/2008 | Lee et al. | |
| 7,426,731 B2 | 9/2008 | Findeisen | |
| 7,475,214 B2 | 1/2009 | Hwang | |
| 7,779,054 B1 * | 8/2010 | Printezis et al. | 707/813 |
| 2002/0170038 A1 * | 11/2002 | Yeh et al. | 717/131 |
| 2003/0056200 A1 | 3/2003 | Li et al. | |
| 2003/0149716 A1 * | 8/2003 | Peterson | 709/101 |
| 2009/0031314 A1 * | 1/2009 | Moscibroda et al. | 718/102 |

* cited by examiner

*Primary Examiner* — Thomas Lee
*Assistant Examiner* — Terrell Johnson
(74) *Attorney, Agent, or Firm* — Hanley, Flight & Zimmerman, LLC (57) ABSTRACT

Example methods, apparatus and articles of manufacture to benchmark hardware and software are disclosed. A disclosed example method includes initiating a first thread to execute a set of instructions on a processor, initiating a second thread to execute the set of instructions on the processor, determining a first duration for the execution of the first thread, determining a second duration for the execution of the second thread, and determining a thread fairness value for the computer system based on the first duration and the second duration.

20 Claims, 9 Drawing Sheets

METHODS AND APPARATUS TO BENCHMARK A COMPUTER SYSTEM BASED ON EXECUTING INSTRUCTIONS USING DIFFERENT NUMBERS OF THREADS

FIELD OF THE DISCLOSURE

This disclosure relates generally to computer systems and, more particularly, to methods and apparatus to benchmark software and hardware.

BACKGROUND

When selecting a computer system, operating system, and/or environment for implementation in a computing environment (e.g., a business), benchmarks are used to select among the available options. Benchmark data can show how well suited a computer system, operating system, and/or environment is for an intended use without the need to install and operate business software for an extended period of time to analyze performance. For example, benchmark data may be used to select among various computer architectures, various virtual machine environments (e.g., JAVA virtual machine environments), various operating system implementations, etc. Benchmark data is often generated by executing a set of instructions on each of the computer system configurations to be analyzed and monitoring the execution. For example, the amount of time needed to execute the set of instructions on each of the computer system configurations may be recorded and compared to determine which computer system configuration is best at executing the instructions.

DETAILED DESCRIPTION

As disclosed herein, an example benchmarking system includes a client and server operating on a computer system. The client receives user input from a user indicative of a number of threads that should be used during benchmarking. The client transmits the number of threads and a workload to the server. The server initiates the number of threads specified by the user. The threads are instructed to each execute instructions included in the workload on a set of data included in the workload. The client tracks the execution duration of each of the threads as well as garbage collection operations associated with the client and the server. The client then generates benchmarking reports. Example reports include a thread fairness value indicative of the amount of variance in thread execution times. A system with high thread fairness (indicated by a high or low fairness value depending on the particular implementation) will generally execute the same set of instructions in substantially or approximately the same amount of time for each thread. While a system with low thread fairness may execute the same set of instructions in different amounts of time in different threads. Accordingly, a system with a high thread fairness benchmark can be selected where it is desirable for threads to execute in the same amount of time. The example reports may also include a garbage collection benchmark that is indicative of the impact of garbage collection processes (e.g., garbage collection performed by a virtual machine) on the execution of threads. While various benchmarks are described herein, a complete benchmark report may include any number and/or type of benchmarks, including known benchmarks not disclosed herein.

Example methods and apparatus to benchmark software and hardware are disclosed. A disclosed example method includes initiating a first thread to execute a set of instructions on a processor, initiating a second thread to execute the set of instructions on the processor, determining a first duration for the execution of the first thread, determining a second duration for the execution of the second thread, and comparing the first duration and the second duration to determine a thread fairness value.

Figure 1:
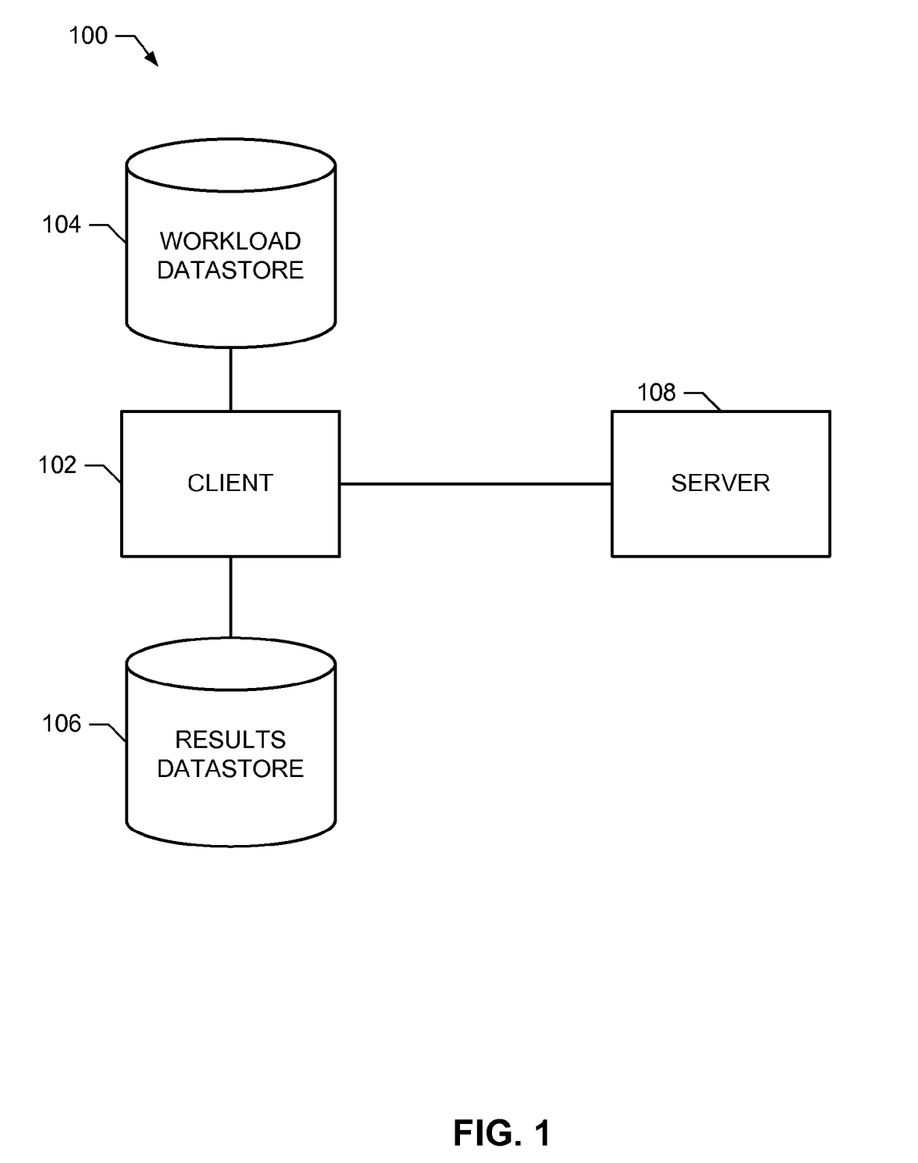
FIG. 1 is a block diagram of an example benchmarking system constructed in accordance with the teachings of this disclosure.

FIG. 1 illustrates an example benchmarking system 100 that may operate on a computer system to benchmark hardware and software of the operating system. The example benchmarking system 100 includes a client 102 that communicates with a workload datastore 104 and a results datastore 106. The example benchmarking system 100 also includes a server 108 that is communicatively coupled to the client 102. The example system 100 may, for example, benchmark the operation of a computer programming environment on a computer system. For example, the benchmarking system 100 may evaluate the performance of a JAVA environment on a computer system.

In general, the client 102 instructs the server 108 to execute instructions that are monitored. The server 108 transmits information about the execution of the instructions to the client 102, which generates benchmarking reports from the information. According to the illustrated example, the client 102 and the server 108 operate on the same computer system to ensure that the benchmarking information is not influenced by other computer systems or network communications. Alternatively, where a group or network of computer systems is to be monitored, the client 102 and the server 108 may be on separate computer systems that are communicatively coupled.

The client 102 of the illustrated example receives user input from a user directing the operation of the benchmarking system 100. For example, the client 102 may include a user interface that enables a user to input a number of concurrent threads that should be executed by the server 108. In addition, the user interface may allow a user to input or specify instructions and/or data that may be used as a workload for the server 108 to process during the benchmarking procedure. The client 102 processes the workload for communication and transmits the workload to the server 108.

The example client 102 further generates reports based on benchmarking results received from the server 108. For example, the client 102 may monitor the execution duration of each of multiple threads initiated by the server 108 based on information receive from the server 108 and generate reports indicative of the performance of the computer system on which the client 102 and the server 108 are operating.

The client 102 is communicatively coupled to the workload datastore 104 to retrieve and/or store instructions and/or data that may be transmitted to the server 108 for use during the benchmarking process. For example, the client 102 may retrieve a set of instructions and a data set from the workload datastore 104 and transmit the instructions and the data set to the server 108. The server 108 may execute the received instructions on the received data set and send information about the execution to the client 102. The workload datastore 104 may be implemented by any type(s) of data structure(s) or device(s) for storing the instructions and the data set. Alternatively, the workload datastore 104 may not be included in the benchmarking system 100 when the instructions and/or the data set are received from an external source (e.g., from user input).

The client 102 of the illustrated example is also communicatively coupled to the results datastore 106. The results datastore 106 stores benchmarking results received from the server 108. The results datastore 106 may additionally store intermediate data generated from the benchmarking results that is used in generating reports. The results datastore 106 may be implemented by any type(s) of data structure(s) and/or device(s).

While the workload datastore 104 and the results datastore 108 are illustrated as being separate from the client 102, one or both of the workload datastore 104 and the results datastore 108 may be included in and/or integrated with the client 102.

Figure 2:
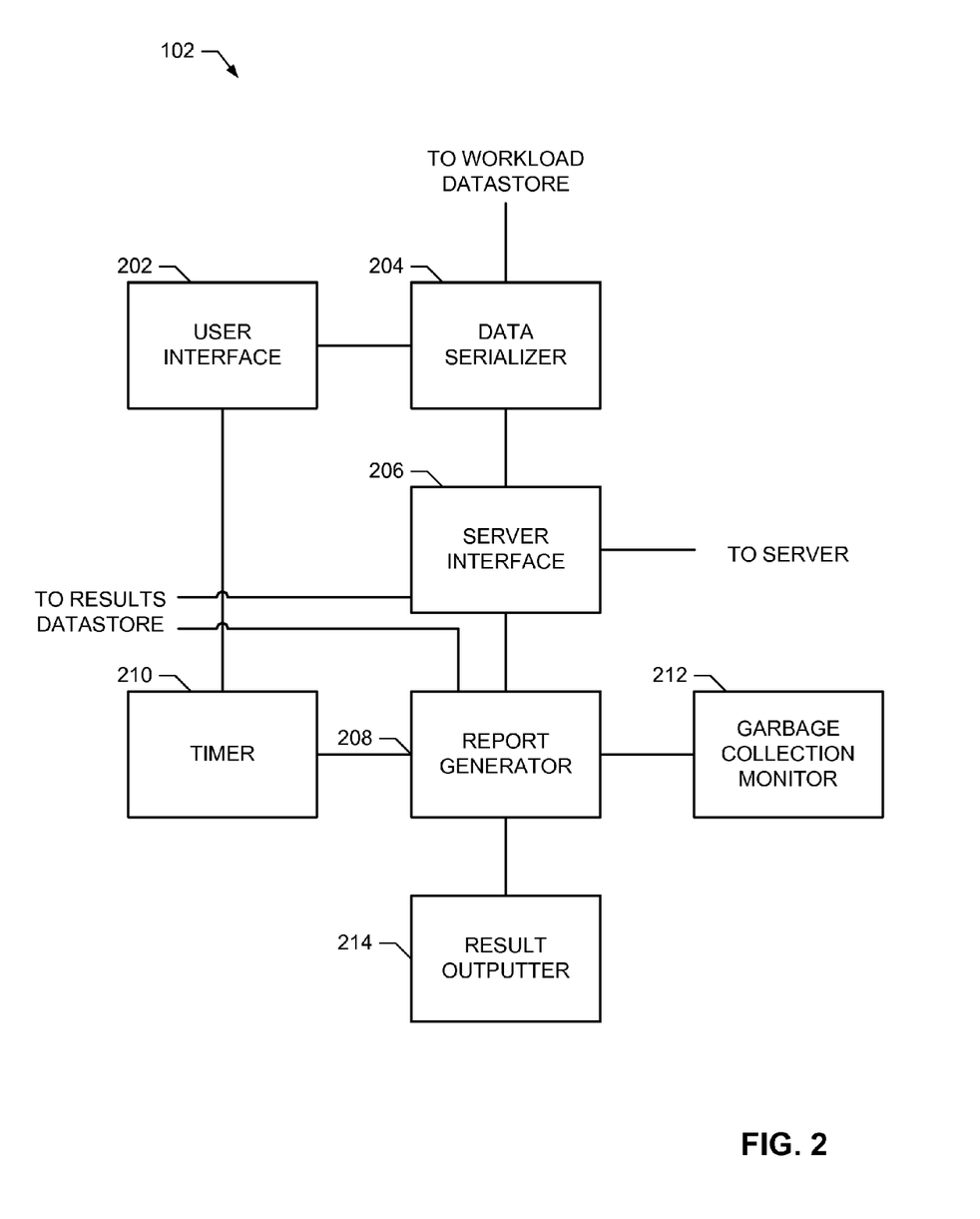
FIG. 2 is a block diagram of an example implementation of the client of FIG. 1.

FIG. 2 is a block diagram of an example implementation of the client 102 of FIG. 1. The example client 102 includes a user interface 202, a data serializer 204, a server interface 206, a report generator 208, a timer 210, a garbage collection monitor 212, and a result outputter 214.

The user interface 202 of the illustrated example enables a user to provide user input to the client 102. The user interface 202 may be implemented by any type of user interface. For example, the user interface 202 may be a graphical user interface, a physical user interface, a command line interface, etc. Alternatively, user input could be received in any other manner. For example, users could provide their input by editing a settings file stored on the client 102. According to the illustrated example, the user input is an indication of a number of threads that should be used during the benchmarking process. The number of threads could be an indication of a single number of threads, a fixed plurality of threads, or a range of numbers of threads that should be iteratively used during benchmarking. The user interface 202 transmits the user input to the data serializer 204.

The data serializer 204 of the illustrated example receives the user input from the user interface 202 and receives and/or retrieves workload data from the workload datastore 104. The data serializer 204 converts the user input and the workload data to a format that can be transmitted over a communication connection (e.g., over a network). For example, the data serializer 204 may convert object data into a sequence of bits for network transmission. The data serializer 204 may perform any type of serializing, data marshalling, data deflating, etc. The output of the data serializer 204 is transmitted to the server interface 206. By way of example, the data serializer 204 may be implemented by the JAVA remote method invocation (RMI) serialization process.

The example server interface 206 is communicatively coupled with a server (e.g., the server 108 of FIG. 1). According to the illustrated example, the client 102 and the server 108 are operated on a single computer system and, thus, the server interface 206 is communicatively coupled to the server 108 internal to the computer system. Alternatively, the server interface 206 could be communicatively coupled to the server 108 via any type of connection such as, for example, a network connection between two computer systems, which may be, for example, in different geographic locations. The server interface 206 transmits or otherwise conveys the data received from the data serializer 204 to the server 108. The example server interface 206 receives data indicative of the operation of the server 108 from the server 108. For example, the data transmitted to the server 108 may be user input, instructions, and a workload data set that have been serialized, wherein the server 108 is to initiate a number of threads indicated by the user input to each execute the instructions on the workload data set. Accordingly, the server interface 206 will then receive an indication from the server 108 when each of the threads completes execution.

When data received from the server 108 has been serialized, the example server interface 206 performs de-serialization of data received from the server 108. The received data is transmitted to the report generator 208 and/or stored in a results datastore (e.g., the results datastore 106).

The example report generator 208 receives data from the server interface 206 and/or retrieves data from the results datastore 106 to generate benchmarking reports for the hardware and/or software of the computer system(s) that are under analysis. For example, the report generator 208 may generate a fairness indication that indicates the deviation in the execution time of multiple threads. To determine the execution time for each thread executed by the server 108, the report generator 208 is communicatively coupled with the timer 210. The timer 210 is started when user interface 202 receives an instruction from a user to begin benchmarking the computer system. The report generator 208 retrieves the current time of the timer 210 when the report generator 208 receives via the server interface 206 an indication that a thread has completed execution at the server 108. Alternatively, the timer 210 could be started at any time. For example, when it is not desired to capture the time required for serializing in the benchmark, the timer could be started after receiving a notification from the server 108 that thread execution has begun or when the instructions have been sent to the server 108. As described in conjunction with FIG. 6, the report generator 208 processes and compares the execution time of each of the threads to determine the fairness indication.

The report generator 208 may also generate a garbage collection report based on data received via the server interface 206 and from the garbage collection monitor 212 that indicates how the garbage collection process(es) of the computer system affect the operation of the computer system's hardware and software. The report generator 208 may generate any type of report. For example, the report may include graphs, raw results, computed statistics, etc. The generated reports are sent to the result outputter 214.

The garbage collection monitor 212 of the illustrated example, monitors garbage collection process(es) of the client 102. For example, the garbage collection monitor 212 may instruct the operating system or system software (e.g., a JAVA virtual machine environment) of the computer system to report garbage collection information to the garbage collection monitor 212. For example, the garbage collection monitor 212 may receive an indication of the duration of each garbage collection process. Alternatively, the garbage collection monitor 212 may receive an indication at the start and stop of each garbage collection process and may utilize the timer 210 to determine the duration of the garbage collection. The garbage collection monitor 212 may be communicatively coupled with another garbage collection monitor (e.g., a garbage collection monitor at the server 108) via the server interface 106 to enable the garbage collection monitor to obtain information about other garbage collection processes. The garbage collection information is transmitted to the report generator 208 for analysis.

The result outputter 214 of the illustrated example receives report information from the report generator 208 and outputs the results. For example, the result outputter 214 may output the results to a display, a printer, a file, etc. The result outputter 214 may additionally or alternatively provide the results to another system or application. For example, the result outputter 214 may output the results to a program for computations or statistical analysis.

Figure 3:
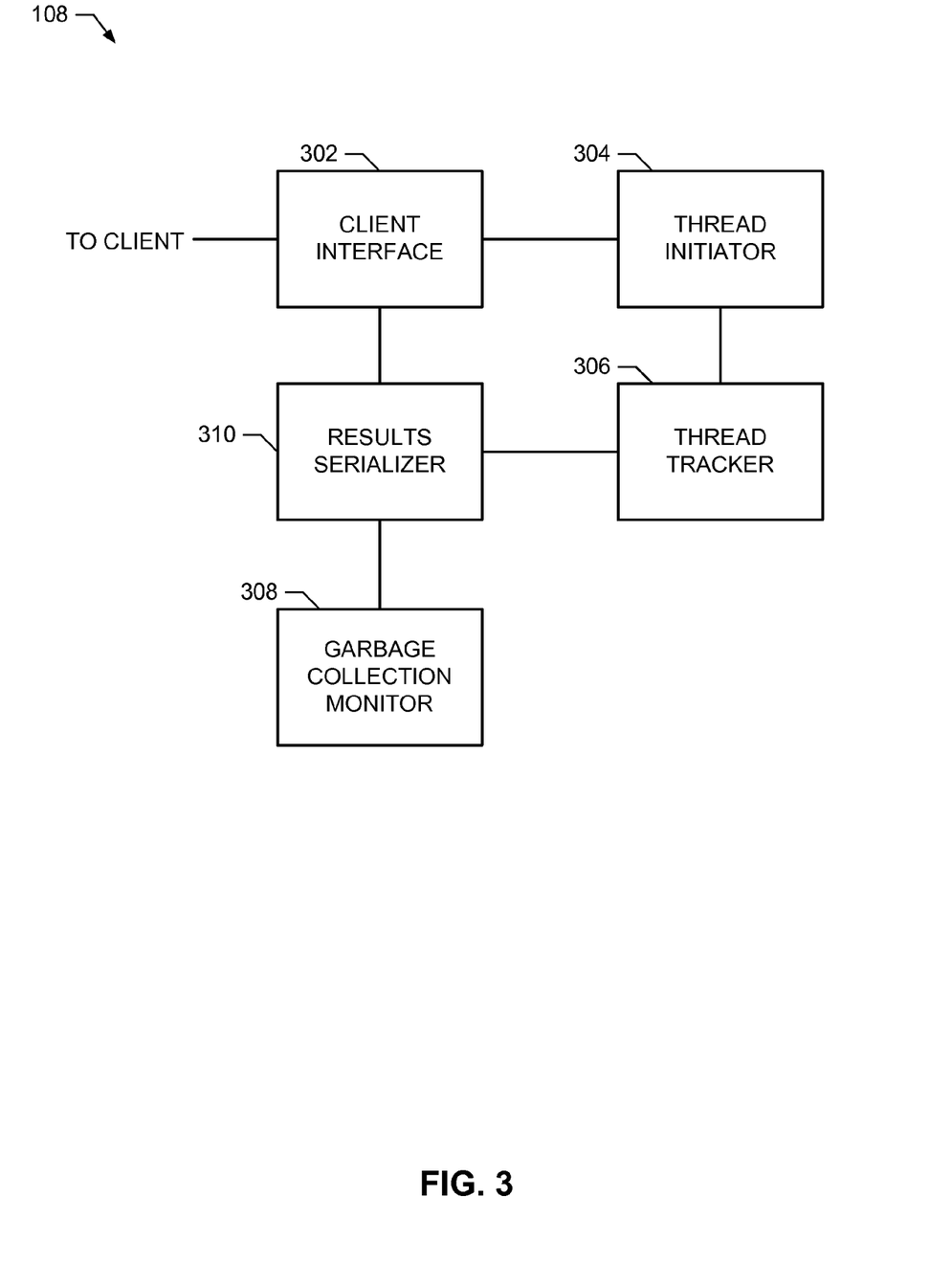
FIG. 3 is a block diagram of an example implementation of the server of FIG. 1.

FIG. 3 is a block diagram of an example implementation of the server 108 of FIG. 1. The example server 108 includes a client interface 302, a thread initiator 304, a thread tracker 306, a garbage collection monitor 308, and a results serializer 310.

The client interface 302 of the illustrated example receives user input and workload data from the client 102 and transmits thread completion and garbage collection information to the client 102. The client interface 302 transmits received user input and workload data to the thread initiator 304.

The thread initiator 304 of the illustrated example receives the user input and the workload data from the client interface 302. The example thread initiator 304 determines a number of threads to be initiated based on the user input received via the client interface 302. For example, the thread initiator 304 may determine that the user has requested that eight threads be initiated. Alternatively, the thread initiator 304 may determine that the user has requested that multiple benchmark processes should be run with a variety of numbers of threads (e.g., 2 threads, 4 threads, 8 threads, 16, threads, and 32 threads). Based on the user input, the thread initiator 304 initiates the number of desired threads to perform instructions included in the workload data that operate on a workload included in the workload data. For example, the thread initiator 304 may instruct an operating system, virtual machine (e.g., the JAVA virtual machine), processor, or any other system to execute the instructions. The instructions may perform functions that are likely to be performed on the computer system when the computer system is deployed (e.g., in a business). For example, the instructions may perform functions that would be executed by accounting software and the workload data may be sample accounting data. Accordingly, the operation of the computer system can be tested using instructions that simulate the intended use of the computer system. According to the illustrated example, all threads are initialized to execute simultaneously. However, threads could alternatively be initiated one at a time or in groups depending on the analysis desired.

The example thread tracker 306 monitors the operation of the threads initiated by the thread initiator 304 and transmits data regarding the threads to the results serializer 310. The example thread tracker 306 sends an indication to the results serializer 310 when each of the threads completes execution of the workload instructions. Alternatively, the thread tracker 306 may include or be in communication with a timer to enable the thread tracker 306 to determine timestamps for and transmit the execution duration of each of the threads. In such an implementation, for example, the timer 210 of FIG. 2 may, but need not, be eliminated. The thread tracker 306 may additionally monitor the number of operations performed by each of the threads, the duration of the execution of each of the threads, etc.

The garbage collection monitor 308 of the illustrated example, monitors garbage collection processes of the server 108. For example, the garbage collection monitor 308 may instruct the operating system or system software (e.g., a JAVA virtual machine environment) of the computer system to report garbage collection information to the garbage collection monitor 308. For example, the garbage collection monitor 308 may receive an indication of the duration of each garbage collection process. Alternatively, the garbage collection monitor 308 may receive an indication at the start and stop of each garbage collection process and may determine the duration of the garbage collection. The garbage collection information is transmitted to the results serializer 310 for transmission to the client 102.

The results serializer 310 of the illustrated example receives results from the thread tracker 306 and the garbage collection monitor 308 and converts them to a format that can be transmitted over a communication connection (e.g., over a network). For example, the results serializer 310 may convert object data into a sequence of bits for network transmission. The results serializer 310 may perform any type(s) of serializing, data marshalling, data deflating, etc. The output of the results serializer 310 is transmitted to the client 102 via the client interface 302. By way of example, the results serializer 310 may be implemented by the JAVA remote method invocation (RMI) serialization process.

While FIGS. 2 and 3 illustrate that certain components are included in the client 102 and the server 108, more or fewer components may be included in the client 102 and/or the server 108. For example, any of the components of the client 102 could be included in the server 108 and any components of the server 108 could be included in the client 102. For example, in an example implementation the timer 210, report generator 208, and result outputter 214 could be included in the server so that they server could timestamp thread executions and report the results.

While an example benchmarking system 100 has been illustrated in FIGS. 1-3, the elements illustrated in FIGS. 1-3 may be combined, divided, re-arranged, eliminated and/or implemented in any way. For example, the benchmarking system 100 may include more than one client 102 and/or more than one server 108. Further, the example client 102, server 108, workload datastore 104, and results datastore 106 of FIG. 1, the user interface 202, the data serializer 204, the server interface 206, the report generator 208, the timer 210, the garbage collection monitor 212, and the result outputter 214 of FIG. 2, and the client interface 302, the thread initiator 304, the thread stacker 306, the results serializer 310, and/or the garbage collection monitor 312 may be implemented by hardware, software, firmware and/or any combination of hardware, software and/or firmware. Thus, for example, any of the example client 102, server 108, workload datastore 104, and results datastore 106 of FIG. 1, the user interface 202, the data serializer 204, the server interface 206, the report generator 208, the timer 210, the garbage collection monitor 212, and the result outputter 214 of FIG. 2, and the client interface 302, the thread initiator 304, the thread stacker 306, the results serializer 310, and/or the garbage collection monitor 312 may be implemented by one or more circuit(s), programmable processor(s), application specific integrated circuit(s) (ASIC(s)), programmable logic device(s) (PLD(s))

and/or field programmable logic device(s) (FPLD(s)), etc. When any of the appended apparatus claims are read to cover a purely software and/or firmware implementation, at least one of the example client 102, server 108, workload datastore 104, and results datastore 106 of FIG. 1, the user interface 202, the data serializer 204, the server interface 206, the report generator 208, the timer 210, the garbage collection monitor 212, and the result outputter 214 of FIG. 2, and the client interface 302, the thread initiator 304, the thread stacker 306, the results serializer 310, and/or the garbage collection monitor 312 are hereby expressly defined to include a tangible medium such as a memory, a digital versatile disc (DVD), a compact disc (CD), etc. storing the software and/or firmware. Further still, the example benchmarking system 100 may include additional devices, servers, systems, networks and/or processors in addition to, or instead of, those illustrated in FIGS. 1-3, and/or may include more than one of any or all of the illustrated devices, servers, networks, systems and/or processors.

Figure 4:
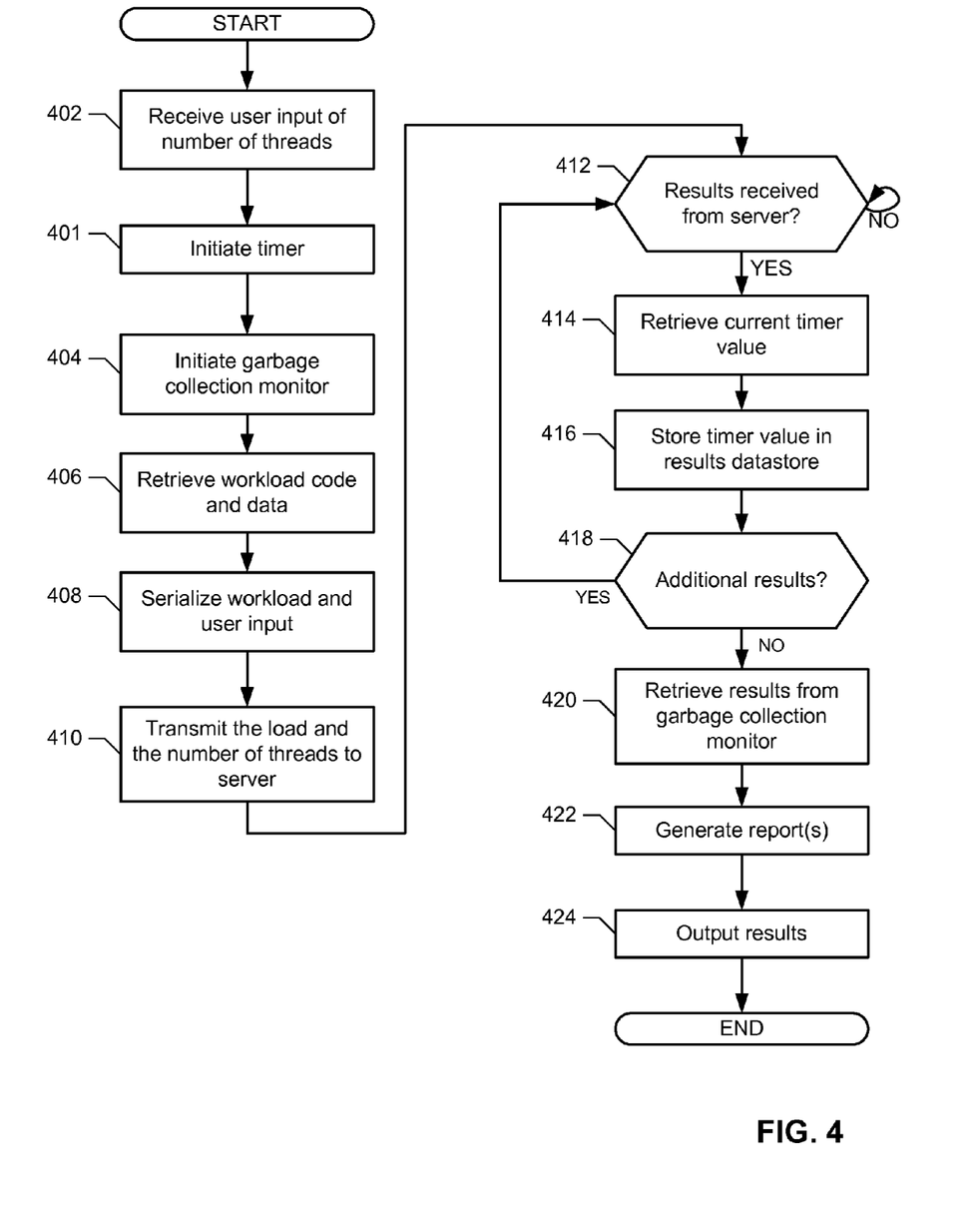
FIG. 4 is a flowchart representative of example machine readable instructions which may be executed to implement the client of FIG. 1.
Figure 5:
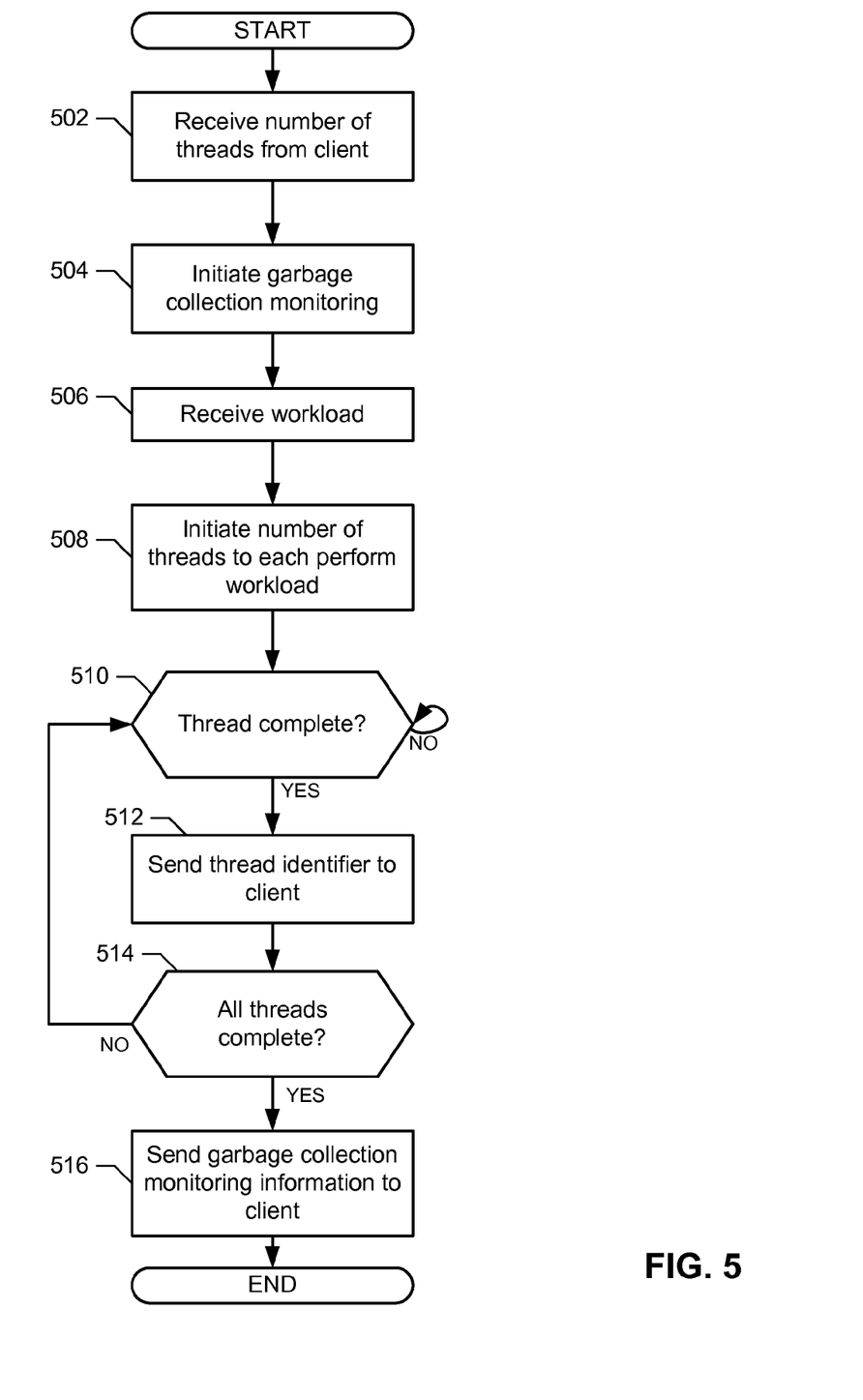
FIG. 5 is a flowchart representative of example machine readable instructions which may be executed to implement the server of FIG. 1.
Figure 6:
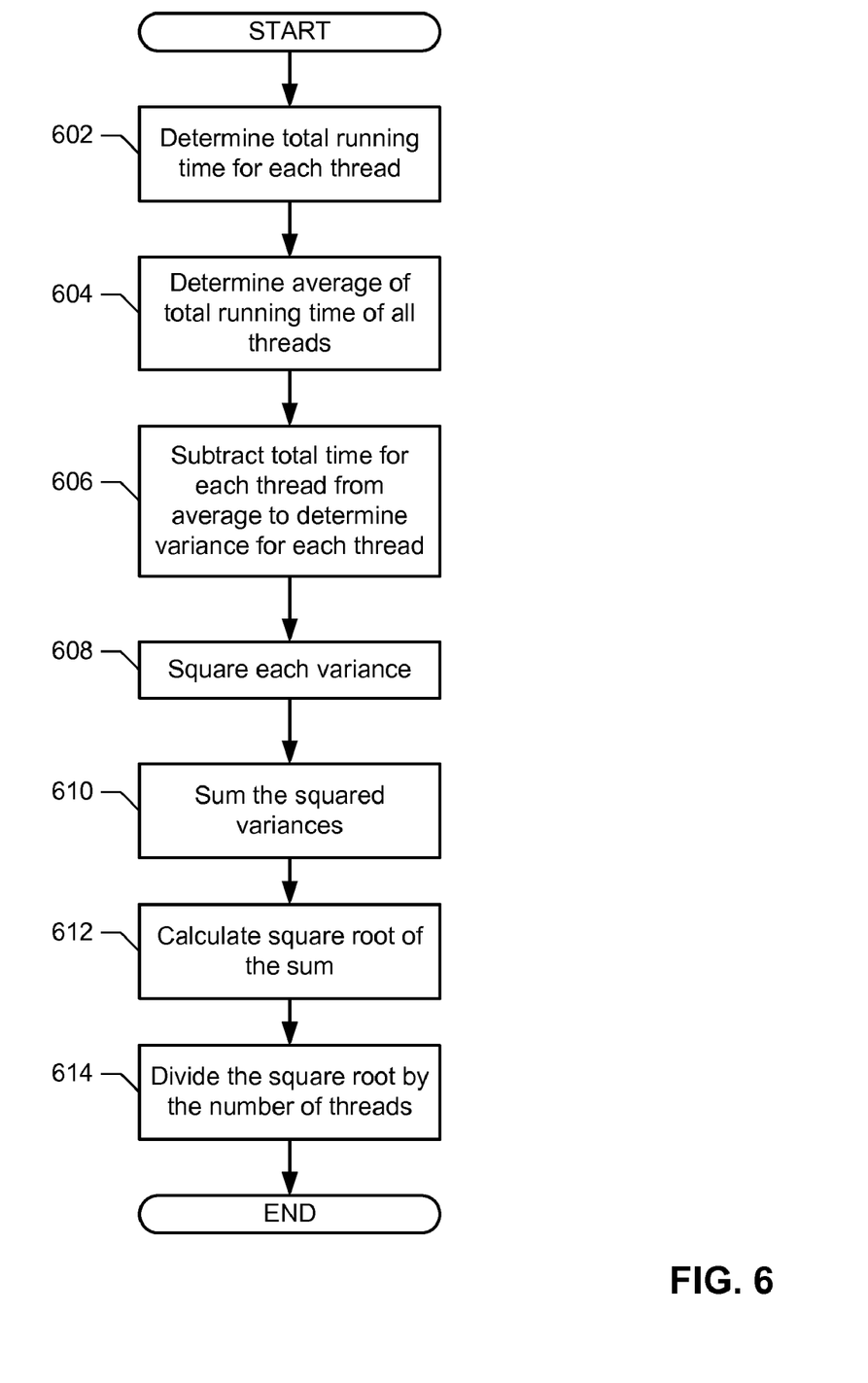
FIG. 6 is a flowchart representative of example machine readable instructions which may be executed by the client of FIG. 1 to analyze benchmarking information from the server of FIG. 1.

FIG. 4 is a flowchart representative of example machine readable instructions that may be executed to implement the client 102 of FIG. 1. FIG. 5 is a flowchart representative of example machine readable instructions that may be executed to implement the server 108 of FIG. 1. FIG. 6 is a flowchart representative of example machine readable instructions that may be executed by the client 102 to analyze benchmarking information from the server 108. The example processes of FIGS. 4-7 may be carried out by a processor, a controller and/or any other suitable processing device. For example, the processes of FIGS. 4-7 may be embodied in coded instructions stored on any article of manufacture, such as any tangible computer-readable medium. Example tangible computer-readable medium include, but are not limited to, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 10). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 4-7 may be implemented using any combination(s) of ASIC(s), PLD(s), FPLD(s), discrete logic, hardware, firmware, etc. Also, some or all of the example processes of FIGS. 4-7 may instead be implemented manually or as any combination of any of the foregoing techniques, for example, any combination of firmware, software, discrete logic and/or hardware. Further, many other methods of implementing the example operations of FIGS. 4-7 may be employed. For example, the order of execution of the blocks may be changed, and/or one or more of the blocks described may be changed, eliminated, sub-divided, or combined. Additionally, any or all of the example processes of FIGS. 4-7 may be carried out sequentially and/or carried out in parallel by, for example, separate processing threads, processors, devices, discrete logic, circuits, etc.

The example process of FIG. 4 begins when the user interface 202 of the example client 102 receives a user input indicating a number of threads to be used during benchmarking (block 402). The garbage collection monitor 212 is then initiated to begin monitoring garbage collection process(es) (block 404). The data serializer 204 then retrieves workload instructions and workload data from the workload datastore 104 (block 406). The example data serializer 204 serializes the received user input, the workload instructions, and the workload data (block 408). The serialized data is then transmitted to the server 108 via the server interface 206 (block 410).

After transmitting the serialized data to the server 108 (block 410), the server interface 206 determines if results indicating that a thread has completed execution have been received from the server 108 (block 412). When no results have been received from the server 108, control remains at block 412 to await the return of results. When a result has been received from the server, the report generator 208 retrieves the current value of the timer (block 414). The report generator 208 stores the timer value in the results datastore 106 (block 416). Then, the report generator 208 determines if there are additional results (e.g., threads are still executing) (block 418). When there are additional results to be received, control returns to block 412 to await the additional results.

When there are no additional results to be received (block 418), the report generator 208 retrieves the results of the garbage collection monitor 212 and/or the garbage collection monitor 308 (block 420). The report generator 208 then generates a report by comparing the received thread execution information and/or the garbage collection information (block 422). For example, the report may be generated as described in conjunction with FIG. 6. Once the report has been generated, the result outputter 214 outputs the results (block 424). The process of FIG. 4 then ends. The client 102 may, for example, wait for the next request from the user.

FIG. 5 is a flowchart representative of an example process that may be carried out to implement the server 108 of FIG. 1. The process of FIG. 5 begins when the client interface 302 of the server 108 receives an indication of a number of threads to be executed from the client (block 502). For example, the indication may be serialized data received from the client and the client interface 302 may de-serialize the data to access the user input. The garbage collection monitor 212 is then initialized to start monitoring garbage collection processes at the server 108 (block 504). The client interface 302 then receives a workload (block 506). For example, the workload may be a set of instructions to be operated on a data set. The workload may be serialized and the client interface 302 may de-serialize the data to access the workload data.

Using the received indication of the number of threads to be executed, the thread initiator 304 causes the initiation of the indicated number of threads to perform the instructions included in the workload data on the data set included in the workload data (block 508). For example, the thread initiator 304 may initiate four threads when the user input indicates a request for four threads. Alternatively, the thread initiator 304 could iteratively initiate groups of threads based on a number of threads input that requests that a range of threads should be processed to analyze the operation of the computer system with each of the indicated numbers of threads. For example, the number of threads may be indicated to be 2, 4, 8, 16, 32, 64, and 128 to test the system with each of the number of threads.

After the threads have been initiated (block 508), the thread tracker 306 determines if any of the threads have completed (block 510). When none of the threads have completed, control remains at block 510 to continue waiting. When a thread has completed execution, the results serializer 310 serializes the thread identifier and sends the thread identifier to the client 102 via the client interface 302 (block 512). The server 108 may send any type of indication to the client 102 that a thread has completed execution so that the client 102 can timestamp the execution of the thread. The thread tracker 306 then determines if there are additional threads executing (block 514). When there are additional threads executing, control returns to block 510 to wait for the next thread to complete execution.

When there are no additional threads executing (block 514), the results serializer 310 serializes the garbage collection information collected by the garbage collection monitor 308 and transmits the garbage collection information to the client 102 via the client interface 302 (block 516). The process of FIG. 5 then ends. The server 108 may, for example, wait for the next request from the client 102.

FIG. 6 is a flowchart representative of an example process that may be performed by the client 102 to analyze benchmarking information from the server 108. For example, the process of FIG. 6 may be performed by the report generator 208 to generate reports during block 416 of FIG. 4. The example process begins by determining a total running time for each thread that was executed by the server 108 (block 602). For example, the report generator 208 may determine the total running time for each thread by subtracting the timer value that was recorded when the thread execution was completed (e.g., in block 414) from an initial timer value (e.g., 0 or an initial value for the timer that was recorded in the results datastore 106). According to the illustrated example, the initial timer value is stored when the benchmarking process begins. Alternatively, an initial timer value could be stored for each thread when, for example, all of the threads are not started simultaneously.

The report generator 208 then compares the total running time for each thread by determining the average of the total running time for each thread (block 604). For example, the report generator 208 may determine the sum of the total running times for all threads and then divide the sum by the number of threads. Any desired computed value may be used such as, for example, the average, the mean, the median, etc. The report generator 208 then subtracts the total running time for each thread (e.g., the total time determined in block 602) from the average value (e.g., determined in block 604) to determine a variance value for each thread (block 606). Alternatively, any other method for determining a variance value for each thread may be used. The report generator 208 then squares each variance to ensure that only positive values are available (block 608). Alternatively, any other method for ensuring that all positive values are available may be used such as, for example, using an absolute value. The squared variance of each of the threads is then summed to determine a total squared variance value (block 610). The report generator 208 then computes the square root of the total squared variance value to determine a square root value (block 612). The square root value is then divided by the number of threads to determine a standard deviation (block 614). The standard deviation is output as the fairness indication for the system. According to the illustrated example, as the fairness value approaches zero the computer system that was analyzed all threads in approximately the same amount of time. As the fairness value moves away from zero, the computer system executes different threads executing the same instructions in different amounts of time. For example, a first thread may be executed in five seconds while a second thread performing the same instructions on the same workload may be performed in ten seconds. Accordingly, a computer system with a fairness value close to zero may be labeled as having a high fairness while systems with greater fairness values are labeled as having lower fairness.

While an example process for determining a fairness value is illustrated in FIG. 6, any other process may be used. For example, any process for determining a standard deviation of a group of thread execution times may be used.

Figure 7:
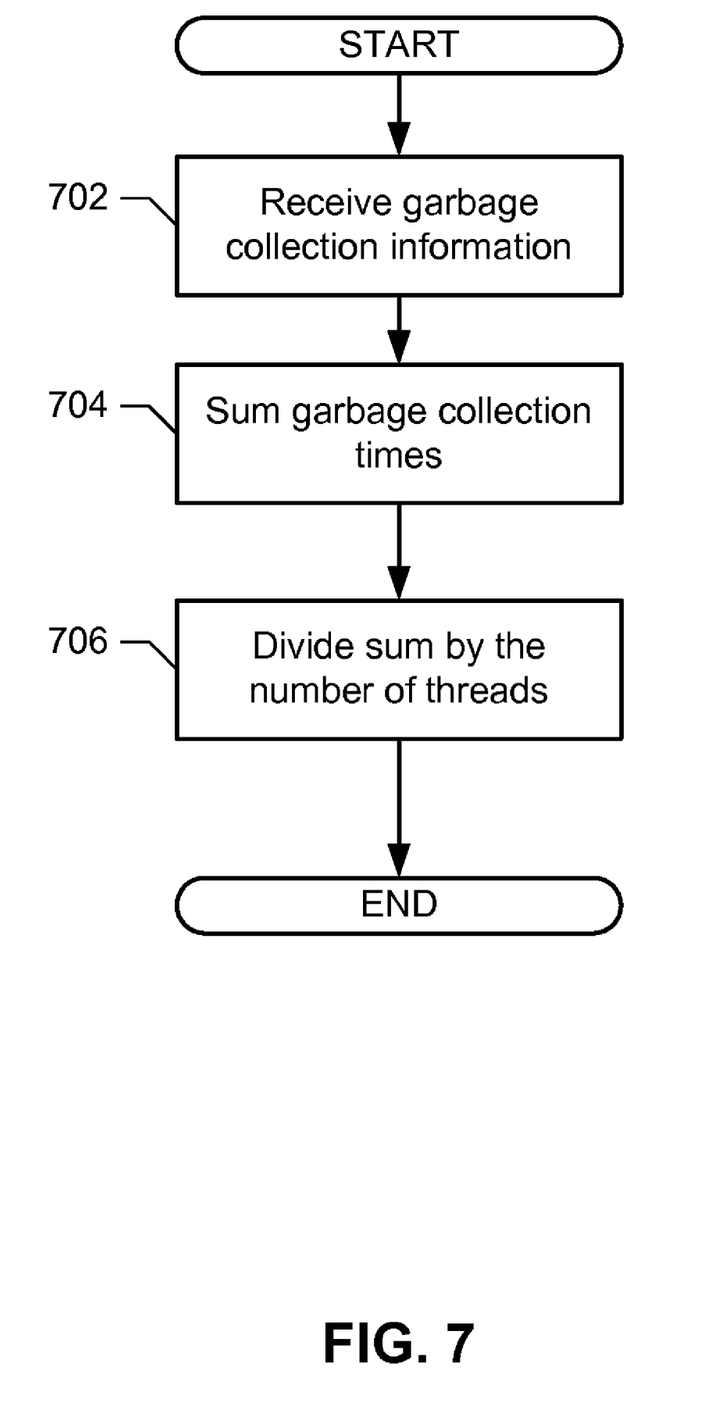
FIG. 7 is a flowchart representative of example machine readable instructions which may be executed to analyze garbage collection information at the client of FIG. 1.

FIG. 7 is a flowchart representative of an example process that may be carried out to analyze garbage collection information at the client 102. The process of FIG. 7 begins when the report generator 208 of the client 102 receives garbage collection information (block 702). For example, the garbage collection information may be received from the garbage collection monitor 212 and/or the garbage collection monitor 308. In the illustrated example, the garbage collection information comprises indications of the duration of each garbage collection process that was performed at the client 102 and/or the server 108. The report generator 208 then sums the garbage collection durations (block 704). The report generator 208 then divides the sum by the number of threads to determine a garbage collection benchmark value (block 706). The benchmark value is indicative of the amount of garbage collection time per executed thread. Accordingly, the benchmark value can be compared with other benchmark values that were determined using a different number of threads.

Figure 8:
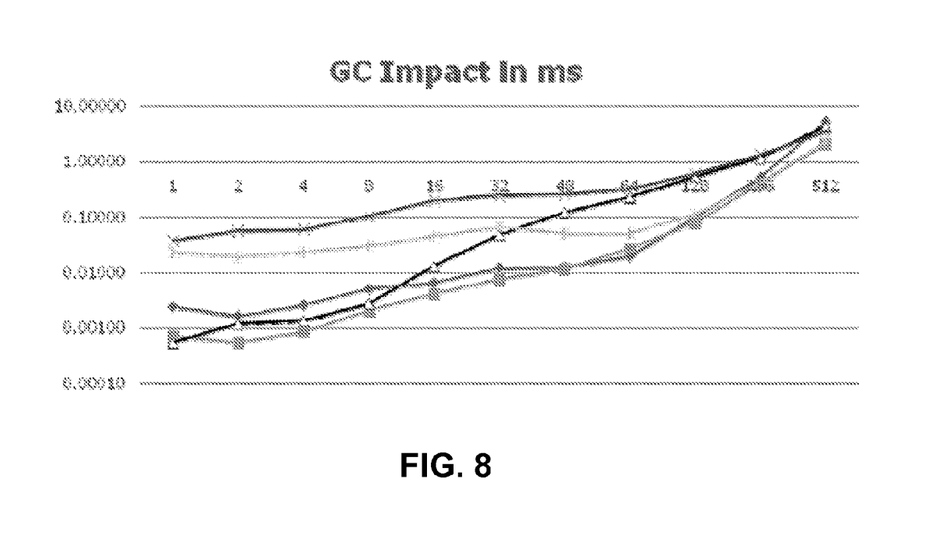
FIG. 8 illustrates an example report generated using the benchmark system to show garbage collection impact on computer systems.

FIG. 8 illustrates an example report generated using the benchmark system 100 to show garbage collection impact on computer systems. The example report illustrates the garbage collection impact on five different computer systems for different numbers of thread executions. The data for the report of FIG. 8 may be generated by iteratively performing the processes represented by FIGS. 4-5. As shown in the illustrated example, as the number of threads increases the garbage collection impact per thread increases as well.

Figure 9:
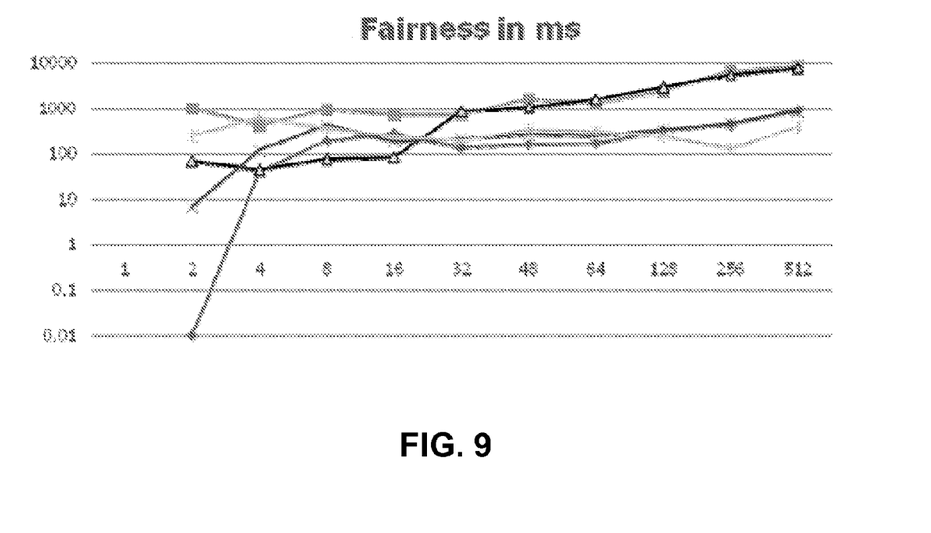
FIG. 9 illustrates an example report generated using the benchmark system to show fairness of computer systems.

FIG. 9 illustrates an example report generated using the benchmark system 100 to show fairness of computer systems. The example report illustrates the fairness of five different computer systems for different numbers of thread executions. The data for the report of FIG. 9 may be generated by iteratively performing the processes represented by FIGS. 4-5. As shown in the illustrated example, as the number of threads increases the fairness value generally increases as well. In other words, the thread fairness is generally greatest when fewer threads are analyzed.

Figure 10:
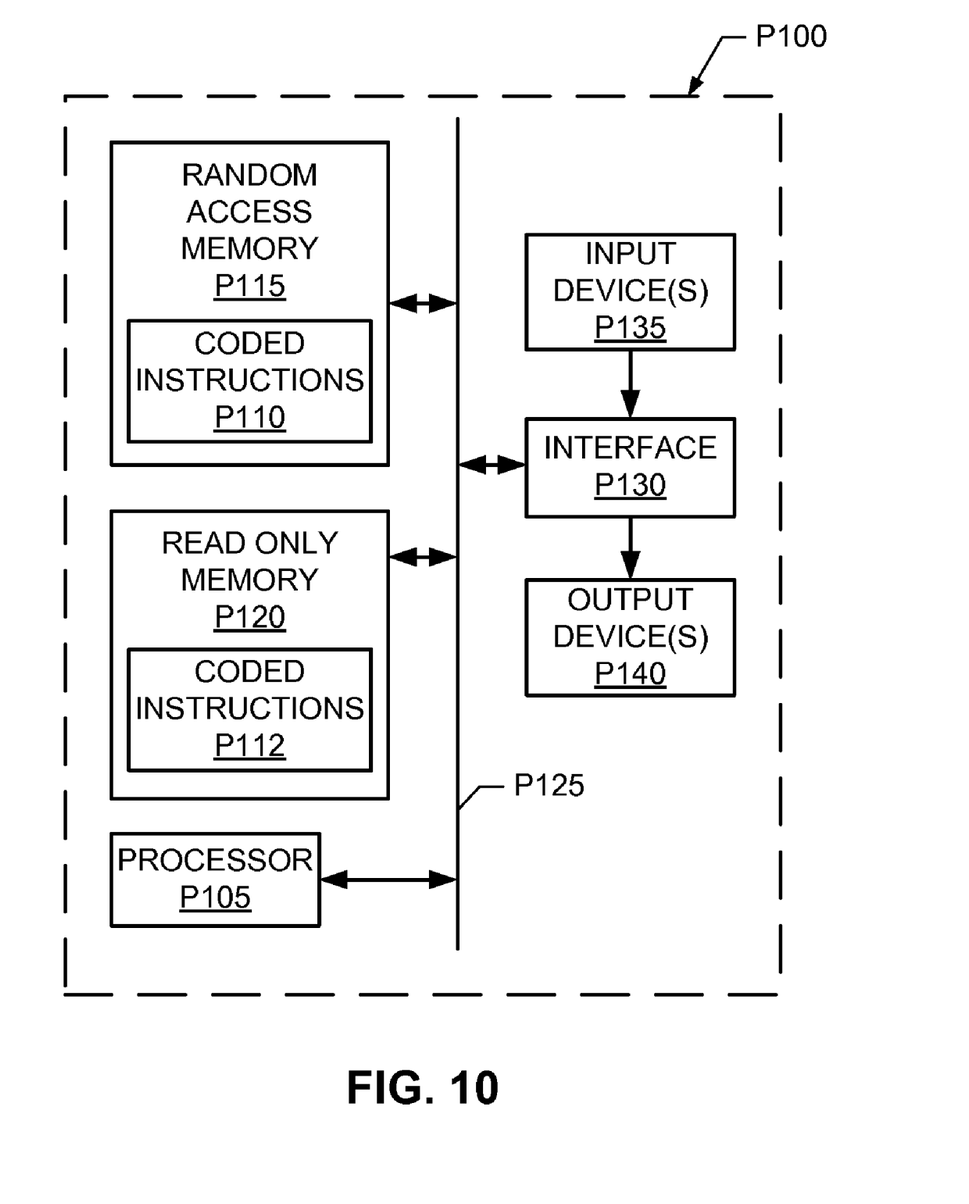
FIG. 10 is a schematic diagram of an example processor platform that may be used and/or programmed to execute the instructions represented by FIGS. 4-7 to implement the example client and/or the example server of FIGS. 1-3.

FIG. 10 is a schematic diagram of an example processor platform P100 that may be used and/or programmed to execute the instructions of FIGS. 4-7 to implement the example client 102 and/or the example server 108 of FIGS. 1-3. For example, the processor platform P100 can be implemented by one or more general-purpose processors, processor cores, microcontrollers, etc.

The processor platform P100 of the example of FIG. 10 includes at least one general purpose programmable processor P105. The processor P105 executes coded and/or machine-accessible instructions P110 and/or P112 stored in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4-6 to implement the example methods, apparatus and articles of manufacture described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P125. The interface circuit P125 may be implemented by any type of interface standard, such as an external memory interface, serial port, general-purpose input/output, etc. One or more input devices P130 and one or more output devices P130 are connected to the interface circuit P125.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to benchmark a computer system comprising:
    initiating a first thread to execute a set of instructions on a processor;
    initiating a second thread to execute the set of instructions on the processor;
    determining a first duration for the execution of the first thread;
    determining a second duration for the execution of the second thread;
    determining a first thread fairness value for the computer system based on the first duration and the second duration;
    determining a second thread fairness value for the computer system for an execution of the set of instructions using a second number of threads different from a first number of threads utilized for the first thread and the second thread; and
    generating a report indicating the first thread fairness value and the second thread fairness value.

2. A method as defined in claim 1, wherein the first thread fairness value is a standard deviation for at least the first duration and the second duration.

3. A method as defined in claim 1, further comprising serializing a workload to be processed by the set of instructions.

4. A method as defined in claim 1, further comprising transmitting the workload from a client to a server.

5. A method as defined in claim 4, wherein the client and the server execute on the same computer system.

6. A method as defined in claim 1, further comprising receiving a user input indicative of a number of threads for execution.

7. A method as defined in claim 6, wherein initiating the first thread and initiating the second thread comprises initiating the number of threads indicated by the user input.

8. A method as defined in claim 1, further comprising receiving an indication from a server that the first thread has completed execution.

9. A method as defined in claim 8, wherein determining the first duration comprises:
    determining a start time for the execution of the first thread;
    in response to the indication from the server that the first thread has completed execution, determining a stop time for the execution of the first thread; and
    subtracting the stop time from the start time to determine the first duration.

10. A method as defined in claim 1, wherein determining the first thread fairness value comprises comparing the first duration and the second duration.

11. A method as defined in claim 1, wherein determining the first thread fairness value comprises determining a standard deviation of the first duration and the second duration.

12. A method as defined in claim 1, wherein determining the first thread fairness value comprises:
    determining an average of the first duration and the second duration;
    subtracting the first duration from the average to determine a first variance;
    subtracting the second duration from the average to determine a second variance;
    adding the first variance and the second variance to determine a total variance; and
    dividing the total variance by the number of threads to determine the first thread fairness value.

13. A computer readable storage device storing instructions that, when executed, cause a computer system to perform operations comprising:
    initiating a first thread to execute a set of instructions on a processor;
    initiating a second thread to execute the set of instructions on the processor;
    determining a first duration for the execution of the first thread;
    determining a second duration for the execution of the second thread;
    determining a first thread fairness value for the computer system based on the first duration and the second duration;
    determining a second thread fairness value for the computer system for an execution of the set of instructions using a second number of threads different from a first number of threads utilized for the first thread and the second thread; and
    generating a report indicating the first thread fairness value and the second thread fairness value.

14. A computer readable storage device as defined in claim 13 wherein the first thread fairness value is a standard deviation for at least the first duration and the second duration.

15. A computer readable storage device as defined in claim 13 wherein the instructions further cause the machine to serialize a workload to be processed by the set of instructions.

16. A computer readable storage device as defined in claim 15, wherein the instructions further cause the machine to transmit the workload from a client to a server.

17. An apparatus to benchmark a computer system comprising:
    a server interface to receive an indication that a first thread has completed execution on a processor and receive an indication that a second thread has completed execution on the processor; and
    a report generator to determine a first duration for the execution of the first thread, determine a second duration for the execution of the second thread, determine a first thread fairness value for the computer system based on the first duration and the second duration, determine a second thread fairness value for the computer system using a second number of threads different from a first numbers of threads utilized for the first thread and the second thread, and generate a report indicating the first thread fairness value and the second thread fairness value.

18. An apparatus as defined in claim 17, wherein the first thread fairness value is a standard deviation for at least the first duration and the second duration.

19. An apparatus as defined in claim 17, further comprising a data serializer to serialize a workload to be executed by the first thread and the second thread.

20. An apparatus as defined in claim 19, wherein the server interface is further to transmit the workload to a server.

* * * * *